Nov. 25, 1941. I. B. NIELSEN 2,263,850
HYDRAULIC COUPLER FOR GREASE FITTINGS
Filed Jan. 30, 1940
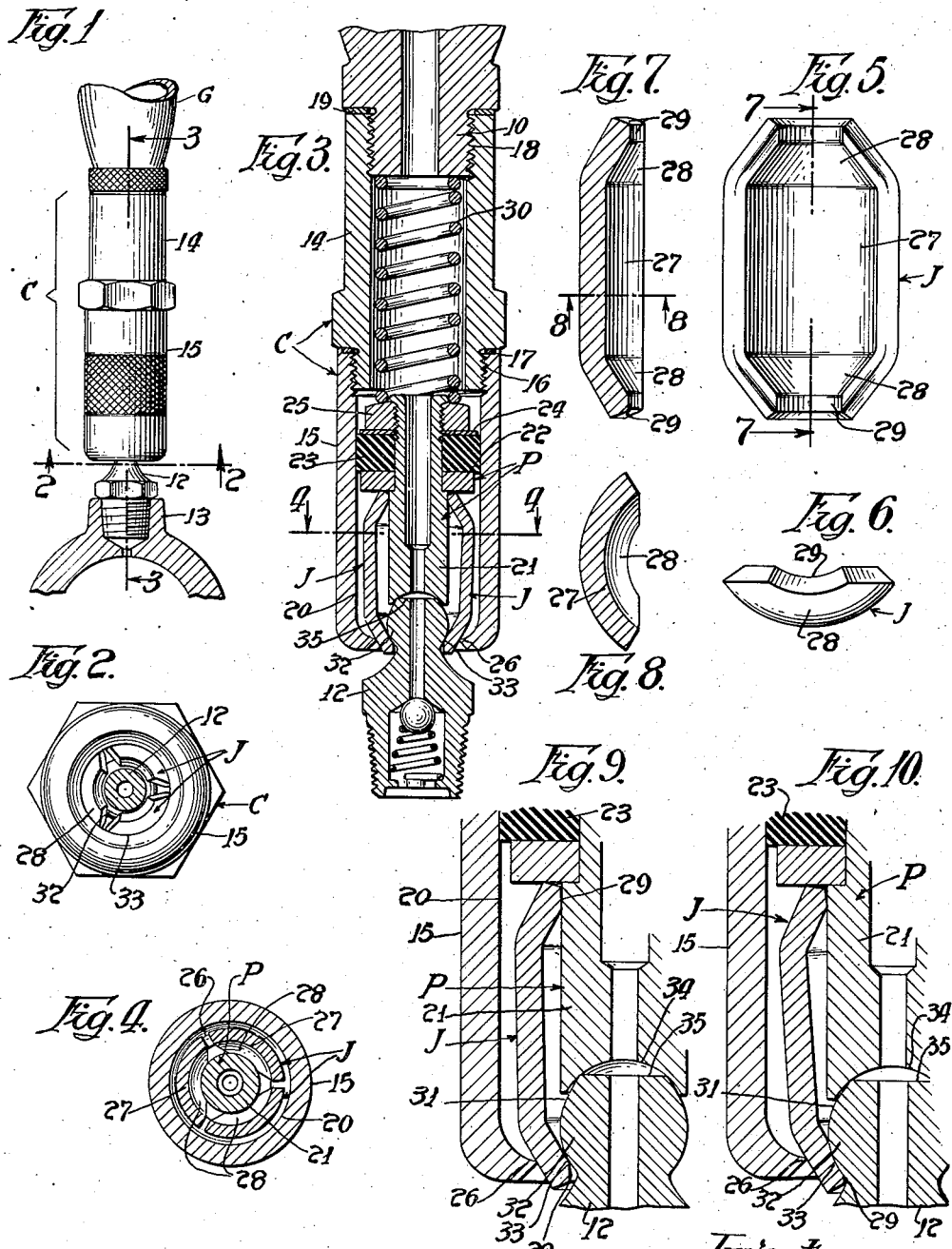
Witness:
E. Camporini
Inventor:
Iver B. Nielsen,
By: Bair & Freeman
Attorneys.

Patented Nov. 25, 1941

2,263,850

UNITED STATES PATENT OFFICE 2,263,850

HYDRAULIC COUPLER FOR GREASE FITTINGS

Iver B. Nielsen, Bryan, Ohio, assignor to The Aro Equipment Corporation, Bryan, Ohio, a corporation of Ohio Application January 30, 1940, Serial No. 316,380

3 Claims. (Cl. 285—170)

My present invention relates to a hydraulic coupler particularly adapted for coupling the discharge fittings of grease guns and the like to headed grease reception fittings.

One object of the invention is to provide a coupler of the character including contractible jaws, the jaws being formed of two or more similar shaped arcuate members, each forming a segment of a cylinder and having its outer end contracted for gripping the head of the fitting in such manner that the jaws "nose in" around the head upon association of the coupler with the fitting and form a very effective connection that resists the high pressure produced by the discharge of grease at high pressure from the grease gun through the coupler to the fitting.

Another object is to provide jaws which are so shaped that even when they are considerably worn they still effect a good grip on the head of the grease reception fitting as they are capable of considerable constriction around the head to effectively retain the coupler against dislocation from the head while the greasing operation is in progress.

A further object is to provide jaw members which are symmetrical in shape and have contractions at both their ends whereby the contractions at the outer ends engage around the head of the grease reception fitting and the contractions at the inner ends serve as pivot points engaging a plunger in the coupler and in turn are engaged by a shoulder of the plunger to force the contractions at the outer ends against a contraction of the body of the coupler to effect gripping of the jaws with relation to the head of the fitting.

Still a further object is to provide jaw members which may be reversed in the coupler when they become so worn on one end that they no longer function properly, the other end being similar in shape so as to properly coact with the grease reception fitting and thus substantially double the life of the jaws.

With these and other objects in view, my invention consists in the construction, arrangement and combination of the various parts of my coupler whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, wherein:

Figure 1 is a side elevation of a hydraulic coupler embodying my invention and showing it coupling a dispenser, such as the discharge end of a grease gun, with a grease reception fitting mounted in a bearing;

Figure 2 is an enlarged sectional view on the line 2—2 of Figure 1 showing the lower end of the coupler in elevation;

Figure 3 is an enlarged vertical sectional view on the line 3—3 of Figure 1;

Figure 4 is a sectional view on the line 4—4 of Figure 3;

Figure 5 is a still further enlarged view showing one of the jaw members of my coupler as viewed from the inside;

Figure 6 is an end view thereof;

Figure 7 is a sectional view on the line 7—7 of Figure 5;

Figure 8 is a sectional view on the line 8—8 of Figure 7;

Figure 9 is a further enlarged fragmentary sectional view showing a portion of Figure 3 and the relation of parts when the jaw members are new, and Figure 10 is a similar view showing the relation of the parts when the jaw members become worn.

In Figure 1, I show the discharge end of a grease gun G, such end consisting of a nipple 10 shown in section in Figure 3. My coupler is indicated generally at C, and at 12 I show a grease reception fitting. The fitting 12 may be screwed into a bearing or the like 13 to be supplied with grease through the coupler C.

The coupler C comprises a tubular body consisting of fittings 14 and 15 screwed together as at 16. A gasket 17 between the fittings 14 and 15 prevents leakage. The upper end of fitting 14 is screwed onto the nipple 10 of the grease gun G, the threads for this purpose being indicated at 18. A gasket 19 is provided to prevent leakage between the parts 10 and 14.

The fitting 15 has a bore 20 in which is mounted a plunger P. The plunger P consists of a sleevelike portion 21 and a series of washers 22, 23 and 24 retained thereon by a lock nut 25. The washer 23 is made of leather, or a suitable composition, that snugly fits the bore 20 so that when grease under pressure is admitted to the bore from the fitting 14 it will compress the washer flatwise and thereby expand it peripherally to serve as a piston in the bore.

The lower end of the fitting 15 has a contraction indicated at 26 and a plurality of jaws J coact with the contraction and with the plunger P in a manner which will hereinafter be described.

The jaws J may be two or more in number, three being perhaps the most satisfactory. Each jaw J has a central portion 27 which is substantially a segment of a cylinder. The terminal ends of the jaw are contracted, as indicated at 28, in the form of hollow truncated cone sections. The contracted portions terminate in arcuate faces 29.

The jaws J are mounted for slidable and radial movement within the tubular fitting 15 with their lower contracted ends 28 engaging the contraction 26 of the sleeve 15. Their upper terminal ends engage the washer 22, which acts as a thrust shoulder therefor. The arcuate faces 29 adjacent the shoulder 22 constitute the only point of contact between the jaws and the sleeve member 21 of the plunger P when the jaws are engaged with the fitting 12. This is perhaps best shown in Figure 9.

The plunger P is yieldingly urged in a downward direction by a spring 30 interposed between the plunger and the nipple 10. The spring 30 serves normally to retain the parts in a position for contracting the jaws J.

Practical operation

In the operation of my hydraulic coupler, the contracted jaws J are engaged with a cone-shaped portion 31 of the head 32 of the fitting 12. The coupler is then pressed toward the fitting and the plunger P, together with the jaws J, will be forced back into the coupler against the action of the spring 30, thereby permitting the jaws to engage deeper within the contraction 26 of the sleeve 15 and expand to such size that they permit entry of the head 32 into the jaws. When the coupler is then released so that it is free to be moved backwardly by the spring 30, the jaws J will engage at the point 33 on the head 22, as shown in Figure 9, to retain the coupler on the fitting 12. The jaws in their gripping action tend to engage the plunger P tightly at its lower concave face 34 with the periphery of the upper face 35 of the fitting 12. Thereafter, when grease is supplied from the grease gun G, the pressure thereof will act on the piston 23 and increase the tightness of this engagement and the tightness of the grip of the jaws J at the points 33.

I am aware that the prior art shows jaws somewhat similar to the ones I have disclosed, but being contracted at their lower ends only. The upper ends are segments of cylinders substantially fitting the outer surface of the plunger sleeves 21 and when jaws of this character become slightly worn they no longer grip the fitting 12 with sufficient tenacity to resist the uncoupling tendency produced by the grease when entering the coupler at high pressure. Such jaws must accordingly be soon discarded as unfit for use.

The jaws I have disclosed, however, having contractions at both ends, cause the point of engagement at 29 to permit considerable "nosing in" action of the jaws as they become worn. A case of extreme wear is shown in Figure 10 and by comparing this figure with Figure 9 it will be noted that the jaws are still effective to be further contracted without interference by contact of their intermediate portions 27 with the plunger sleeve 21. The point of engagement at 29 serves effectively as a pivot point to permit an extreme amount of constriction of the jaws before they are unfit for further use. Thereupon the jaws may be reversed and the unworn lower ends then serve to grip the head of the grease reception fitting. This will substantially double the life of the jaw member which has already been considerably increased over the usual type, due to the operation illustrated in Figures 9 and 10.

From the foregoing, it is obvious that I have provided jaw members which have a considerably longer life than the usual type. Their gripping action is very effective even when they are considerably worn and/or when the grease reception fitting itself is substantially worn and which cannot be held by conventional jaws.

The jaws may be made at relatively small expense. It will be noted that they are of substantially uniform thickness throughout and it may be mentioned that they may be readily formed of sheet metal cut and stamped to shape. By contracting both ends of the jaws, they operate in a very desirable manner to secure the greatest effectiveness in the constricting or gripping action.

As many changes could be made in the foregoing construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention which, as a matter of language, might be considered as falling therebetween.

I claim as my invention:

1. A hydraulic coupler comprising a sleeve having a bore which is contracted at one end, a plurality of arcuate jaws radially and axially movable in said sleeve, said jaws being of substantially uniform thickness throughout and having both ends in the form of cone segments, a plunger slidable in said sleeve and adapted to make sealing engagement with a head of a headed fitting in said jaws, a shoulder on said plunger abutting said jaws for urging them toward said contracted end of said sleeve whereby the inner cone segment ends of the jaws engage said plunger substantially only adjacent said plunger and the outer contracted ends of the jaws engage the contracted end of the sleeve and are thereby constricted around the head of the headed fitting when said plunger is urged to move toward said contracted end of said sleeve, said plunger being so movable by the pressure of grease entering said coupler.

2. A coupler comprising a body having a discharge end, a plurality of semi-cylindrical jaws movably carried therein adjacent said discharge end, said jaws having contracted inner and outer ends in the shape of cone segments for providing gripping parts for engagement with a grease fitting, said contracted inner ends, due to such cone segment shape, affording means for causing the outer ends to nose in on said fitting and thereby supplement the grip of the coupler on the fitting, said ends being reversible end for end.

3. A coupler comprising a body having a discharge end, a plurality of semi-cylindrical jaws movably carried therein adjacent said discharge end, said jaws having similar contracted inner and outer ends, each in the shape of a hollow cone-shaped segment, said jaws being thereby reversible end for end.

IVER B. NIELSEN.